United States Patent
Hanna et al.

(10) Patent No.: US 11,387,092 B2
(45) Date of Patent: Jul. 12, 2022

(54) THERMAL DESORPTION TUBE SAMPLER (71) Applicant: IP2IPO INNOVATIONS LIMITED, London (GB)

(72) Inventors: George Hanna, London (GB); Andrea Romano, London (GB)

(73) Assignee: IP2IPO INNOVATIONS LIMITED, London (GB)

( * ) Notice: Subject to any disclaimer, the term of this patent is extended or adjusted under 35 U.S.C. 154(b) by 0 days.

(21) Appl. No.: 17/255,938

(22) PCT Filed: Jul. 2, 2019

(86) PCT No.: PCT/GB2019/051874
§ 371 (c)(1),
(2) Date: Dec. 23, 2020

(87) PCT Pub. No.: WO2020/008184
PCT Pub. Date: Jan. 9, 2020

(65) Prior Publication Data
US 2021/0118660 A1    Apr. 22, 2021

(30) Foreign Application Priority Data
Jul. 2, 2018  (GB) .................................. 1810839

(51) Int. Cl.
*H01J 49/40* (2006.01)
*H01J 49/04* (2006.01)
*G01N 30/72* (2006.01)

(52) U.S. Cl.
CPC ........ *H01J 49/049* (2013.01); *G01N 30/7206* (2013.01); *H01J 49/0422* (2013.01); *H01J 49/40* (2013.01)

(58) Field of Classification Search
CPC ...... H01J 49/049; H01J 49/0422; H01J 49/40; H01J 49/0468; G01N 30/7206; G01N 30/62; G01N 2030/128; G01N 2030/884
(Continued)

(56) References Cited

U.S. PATENT DOCUMENTS 4,495,414 A * 1/1985 Barrie ................. H01J 49/0422
                                                 250/282
5,272,337 A * 12/1993 Thompson .......... H01J 49/0422
                                                 250/288

(Continued)

FOREIGN PATENT DOCUMENTS

| EP | 0083472 | 2/1986 |
|---|---|---|
| EP | 0902283 | 3/1999 |

(Continued)

OTHER PUBLICATIONS

Search and Examination Report dated Dec. 20, 2018 in GB Patent Application No. GB1810839.9.

(Continued)

*Primary Examiner* — Michael Maskell
(74) *Attorney, Agent, or Firm* — Sheppard, Mullin, Richter & Hampton LLP (57) ABSTRACT

The disclosure provides a thermal desorption (TD) tube sampler. The sampler comprises a first connector configured to reversibly connect to a TD tube containing a sample, and a second connector configured to couple to a direct injection mass spectrometer. The TD tube sampler is configured to desorb a sample in a TD tube connected thereto, and feed the desorbed sample from the TD tube to a direct injection mass spectrometer such that the desorbed sample does not pass through a cold trap.

13 Claims, 9 Drawing Sheets

(58) Field of Classification Search
USPC .................................... 250/281, 282, 288
See application file for complete search history.

(56) References Cited

U.S. PATENT DOCUMENTS

| | | | | |
|---|---|---|---|---|
| 7,645,611 | B2* | 1/2010 | Pawliszyn | G01N 1/40 |
| | | | | 436/43 |
| 2007/0023627 | A1* | 2/2007 | Finch | H01J 49/0418 |
| | | | | 250/288 |
| 2011/0147580 | A1 | 6/2011 | Bell et al. | |
| 2012/0258717 | A1 | 10/2012 | Handforth et al. | |

FOREIGN PATENT DOCUMENTS

| | | |
|---|---|---|
| GB | 1224915 | 3/1971 |
| WO | WO1993/021654 | 10/1993 |
| WO | WO2014/170384 | 10/2014 |
| WO | WO2018/013946 | 1/2018 |

OTHER PUBLICATIONS

Krzymien & Elias, "Sampling and Analysis of Flue Gases from a Plasma Incinerator," Analytica Chimica Acta 1986, 190, 133-142.
Ueno et al., "Portable automatic BTX measurement system with microfluidic device using mesoporous silicate adsorbent with nano-sized pores," Sensors and Actuators B 2003, 95, 282-286.
Amann et al., "Analysis of Exhaled Breath for Disease Detection," The Annual Review of Analytical Chemistry 2014, 7, 455-482.
CHOW et al., "The application of thermal methods for determining chemical composition of carbonaceous aerosols: A review," Journal of Environmental Science and Health Part A 2007, 42(11), 1521-1541.
Crespo et al., "Proton-transfer reaction mass spectrometry (PTRMS) in combination with thermal desorption (TD) for sensitive off-line analysis of volatiles," Rapid Common. Mass Spectrom 2012, 26(8), 990-996.
Doran et al., "Optimisation of sampling parameters for standardised exhaled breath sampling," Journal of Breath Research 2018, 12, in 12 pages.
Erickson et al., "Measuring long chain alkanes in diesel engine exhaust by thermal desorption PTR-MS," Atmos. Meas. Tech. 2014, 7, 225-239.
Holzinger et al., "Aerosol analysis using a Thermal-Desorption Proton-Transfer-Reaction Mass Spectrometer (TD-PTR-MS): a new approach to study processing of organic aerosols," Atmos. Chem. Phys. 2010, 10(5), 2257-2267.

Horváth et al., "A European Respiratory Society technical standard: exhaled biomarkers in lung disease," Euro Respir J 2017, 49(4), in 26 pages.
Hryniuk & Ross, "Detection of acetone and isoprene in human breath using a combination of thermal desorption and selected ion flow tube mass spectrometry," International Journal of Mass Spectrometry 2009, 285, 26-30.
International Search Report and Written Opinion dated Oct. 10, 2019 in PCT Patent Application No. PCT/GB2019/051874.
Jordan et al., "A high resolution and high sensitivity proton-transfer reaction time-of-flight mass spectrometer (PTR-TOF-MS)," International Journal of Mass Spectrometry 2009, 286, 122-128.
Kloos et al., "Analysis of biologically-active endogenous carboxylic acids based on chromatography-mass spectrometry," Trends in Analytical Chemistry 2014, 61, 17-28.
Kumar et al., "Selected Ion Flow Tube Mass Spectrometry Analysis of Exhaled Breath for Volatile Organic Compound Profiling of Esophago-Gastric Cancer," Analytical Chemistry 2013, 85, 6121-6128.
Kumar et al., "Mass Spectrometric Analysis of Exhaled Breath for the Identification of Volatile Organic Compound Biomarkers in Esophageal and Gastric Adenocarcinoma," Annals of Surgery 2015, 262, 981-990.
Markar et al., "Research protocol for a diagnostic study of non-invasive exhaled breath analysis for the prediction of oesophago-gastric cancer," BMJ Open 2016, 6, 1-4.
Markar et al., "Breath Volatile Organic Compound Profiling of Colorectal Cancer Using Selected Ion Flow-tube Mass Spectrometry," Annals of Surgery 2019, 269, 903-910.
Romano & Hanna, "Identification and quantification of VOCs by proton transfer reaction time of flight mass spectrometry: An experimental workflow for the optimization of specificity, sensitivity, and accuracy," Journal of Mass Spectrometry 2018, 53, 287-295.
Schieberle & Molyneux, Quantitation of Sensory-Active and Bioactive Constituents of Food: A *Journal of Agricultural and Food Chemistry* Perspective 2012, 60, 2404-2408.
Smith et al., "Mass Spectrometry for real-time quantitative breath analysis," Journal of Breath Research 2014, 8, 1-23.
Španěl et al., "Acetone, ammonia and hydrogen cyanide in exhaled breath of several volunteers ages 4-83 years," Journal of Breath Research 2007, 1, in 4 pages.
The R Core Team, "R: A Language and Environment for Statistical Computing," Vienna, Austria, Sep. 28, 2017.

* cited by examiner

THERMAL DESORPTION TUBE SAMPLER

RELATED APPLICATIONS

The present application is a U.S. national phase application under 35 U.S.C. § 371 of International Application No. PCT/GB2019/051874, filed on Jul. 2, 2019, and published as WO2020008184 on Jan. 9, 2020; which claims the priority of GB Application No. 1810839.9, filed on Jul. 2, 2018. The content of each of these related applications is hereby incorporated by reference in its entirety.

The present invention relates to a thermal desorption (TD) tube sampler, and particularly a novel TD tube sampler which may be coupled to a direct injection mass spectrometer. The invention extends to an apparatus comprising a mass spectrometer and TD tube sampler, and to a method of analysing a sample.

Alterations in the Volatile Organic Compound (VOC) profile of exhaled breath have been reported for different types of cancer types and benign diseasesl[1,2]. The perspective of using breath analysis for diagnostic purposes is very appealing in healthcare systems as breath tests are non-invasive, risk-free and have very good patient acceptability. The necessity to translate laboratory findings and single-centre studies to large scale and multicentre level poses several challenges in the collection, transport and analysis of large numbers of breath samples[3]. Thermal Desorption (TD) is a well-established technological standard in the fields of environmental analysis and occupational health[4], where it is usually coupled to Gas Chromatography-Mass Spectrometry (GC-MS). TD tubes represent a robust solution for sample collection, transport and storage and TD-GC-MS provides reliable means to perform breath VOC analysis, but the time required for the chromatographic separation often results in low analytical throughput.

Direct-injection MS techniques, such as Selected Ion Flow Tube Mass Spectrometry (SIFT-MS) or Proton Transfer Reaction Time-of-Flight Mass Spectrometry (PTR-ToF-MS), offer potential clinical advantage over GC-MS with their reduced analytical times. Both quadrupole-based SIFT-MS and PTR-MS have already been coupled to commercial, two-stage desorption TD systems[5,6]. In two-stage TD, VOCs are first transferred from the TD tube to a cold trap, that is generally filled with the same sorbent as the TD tube. The cold trap material is then desorbed by applying a very steep temperature ramp (40° C. $s^{-1}$ or higher), which ultimately results in the transfer of VOCs to the analyzer by means of a short pulse (typically a few seconds). This is to comply with the requirements of GC-MS, where a quick transfer of VOCs onto the column is essential to optimal chromatographic resolution. This constitutes a limitation for the reported TD-SIFT-MS and TD-PTR-MS, as quadrupole mass analyzers are poorly suited to the monitoring of multiple mass-to-charge signals over restricted periods of time. The introduction of PTR-ToF-MS[7], with its high time resolution, represents a considerable step forward in terms of performance with respect to coupling to TD. Hyphenated systems have been developed, based on the coupling of PTR-ToF-MS to Collection-Thermal-Desorption (CTD) traps[8,9]. CTD is based on a single, custom-made collection cell, which undergoes a continuous adsorption/desorption cycle. These systems are particularly suited to atmospheric analysis, with a focus on sample concentration and in situ automated measurement, but they do not allow for sample transportability.

As hundreds of individual breath samples can be collected onto TD tubes every week in the framework of a multi-centre clinical trial, the absence of a commercially available technology for wide scale analytical trials represents a major bottleneck in the analytical workflow.

The present invention arises from the inventors work in attempting to overcome the problems associated with the prior art.

In accordance with a first aspect of the invention there is provided a thermal desorption (TD) tube sampler, wherein the sampler comprises a first connector configured to reversibly connect to a TD tube containing a sample, and a second connector configured to couple to a direct injection mass spectrometer, and the TD tube sampler is configured to desorb a sample in a TD tube connected thereto, and feed the desorbed sample from the TD tube to a direct injection mass spectrometer such that the desorbed sample does not pass through a cold trap.

Advantageously, the sampler displays a higher throughput than prior art samplers. Furthermore, a direct injection mass spectrometer coupled to the sampler exhibits greater sensitivity than it would if coupled to a prior art sampler.

A cold trap may be viewed as a component configured to absorb the sample after it has been released from the TD tube. For instance, the cold trap may comprise a sorbent bed. The sorbent bed may comprise a resin and/or a carbon. A cold trap may be configured to apply a temperature ramp configured to cause a sample disposed in the sorbent bed to desorb.

In one embodiment, the TD tube sampler does not comprise a cold trap. Accordingly, the TD sampler may comprise a conduit which extends between the first connector and the second connector. The conduit may comprise steel, preferably stainless steel.

Preferably, the conduit comprises an aperture therein fluidly connecting an internal channel of the conduit to an external environment. Preferably, the aperture has a diameter between 0.01 and 15 mm, between 0.025 and 12.5 mm, between 0.05 and 10 mm or between 0.075 and 7.5 mm more preferably between 0.1 and 5 mm, between 0.2 and 4 mm, between 0.3 and 3 mm or between 0.4 and 2 mm, and most preferably between 0.5 and 1.5 mm. Advantageously, in the case of deviations in the flow of the desorbed sample the aperture allows a fluid in the conduit to vent to the external environment or for fluid in the external environment to flow into the conduit, thereby preventing damage to the TD tube sample and/or the direct injection mass spectrometer.

In an alternative embodiment, the TD tube sampler comprises a cold trap. The TD tube sampler may be configured to couple to a gas chromatography mass spectrometer (GC-MS). Accordingly, the TD tube sampler may have a first operating mode, for use when the TD tube sampler is coupled to a direct injection mass spectrometer, wherein the TD sampler is configured to feed the sample from the TD tube to the direct injection mass spectrometer such that the sample does not pass through a cold trap; and a second operating mode, for use when the TD tube sampler is coupled to a GC-MS, wherein the TD sampler is configured to feed the sample from the TD tube to the direct injection mass spectrometer such that the sample does pass through a cold trap. Preferably, a user can select between the first and second operating modes. Advantageously, the TD tube sampler may be used with a variety of mass spectrometers.

Accordingly, the TD sampler may comprise:
a valve;
a first conduit extending between the first connector and the valve;
a second conduit extending between the valve and the second connector; and a third conduit extending between the valve and the cold trap.

The valve may be a three port valve. The valve may be a solenoid valve, and preferably a three port solenoid valve.

The conduits may comprise steel, preferably stainless steel.

One or more of the conduits may comprise an aperture therein fluidly connecting an internal channel of the conduit to an external environment. Preferably, the first conduit and/or the second conduit comprise an aperture.

When the TD tube sampler is in the first operating mode, the valve may be configured to be in a first configuration. In the first configuration, the valve may be configured to fluidly connect the first conduit to the second conduit. In the first configuration, the valve may be configured to not fluidly connect the first conduit to the third conduit. In the first configuration, the valve may be configured to not fluidly connect the second conduit to the third conduit. Accordingly, the sample can be fed from the TD tube to the mass spectrometer without passing through the cold trap.

When the TD tube sampler is in the second operating mode, the valve may be configured to be in a second or third configuration. In the second configuration, the valve may be configured to fluidly connect the first conduit to the third conduit. In the third configuration, the valve may be configured to fluidly connect the second conduit to the third conduit. In the second and third configurations, the valve may be configured to not fluidly connect the first conduit to the second conduit. When the TD tube sampler is in the second operating mode, the valve may be configured to switch between the second and third configurations. Accordingly, the sample can be fed from the TD tube to the cold trap and, subsequently, from the cold trap to the mass spectrometer. However, the sample cannot be fed directly from the TD tube to the mass spectrometer.

The TD tube sampler may comprise a controller configured to switch the valve to the first configuration when a user selects the first operating mode. The controller may be configured to switch the valve to the second or third configuration when a user selects the second operating mode. The controller may be configured to switch the valve between the second and third configurations when the TD tube sampler is in the second operating mode. In embodiments where the valve is a solenoid valve, the controller may be configured to switch the valve by sending an electrical signal to the valve.

The direct injection mass spectrometer may comprise a selected ion flow tube mass spectrometer (SIFT-MS), a proton transfer reaction mass spectrometer (PTR-MS), or an ion mobility spectrometer (IMS). Preferably, the proton transfer reaction mass spectrometer is a proton transfer reaction time-of-flight mass spectrometer (PTR-ToF-MS).

A TD tube may be viewed as a container comprising a sorbent bed. The sorbent bed may comprise a resin and/or a carbon.

The sample preferably comprises one or more volatile organic compounds (VOCs). It may be appreciated that VOCs are organic compounds with a high vapour pressure at room temperature.

The TD sampler may be configured to desorb the sample for at least 1 minute, preferably at least 2 minutes, at least 4 minutes or at least 6 minutes, and most preferably at least 8 minutes. The TD sampler may be configured to desorb the sample for less than 20 minute, preferably less than 18 minutes, less than 16 minutes or less than 14 minutes, and most preferably less than 12 minutes. The TD sampler may be configured to desorb the sample for between 1 minute and 20 minutes, preferably between 2 minutes and 18 minutes, between 4 minutes and 16 minutes or between 6 minutes and 14 minutes, and most preferably between 8 minutes and 12 minutes. Advantageously, the inventors have found that a desorption time of 10 minutes allowed attainment of 80% recovery or higher for all the analytes evaluated.

Accordingly, the TD tube sampler may be configured to desorb the sample by being configured to heat the TD tube to an elevated temperature. The TD tube sample may be configured to heat the TD tube to a temperature of at least 100° C., more preferably at least 150° C., at least 200° C. or at least 250° C., and most preferably at least 260° C. or at least 270° C. The apparatus may be configured to heat the TD tube to a temperature of between 100° C. and 450° C., more preferably between 150° C. and 400° C., between 200° C. and 350° C. or between 250° C. and 310° C., and most preferably between 260° C. and 300° C. or between 270° C. and 290° C.

Alternatively, or additionally, the TD tube sampler may be configured to desorb the sample by being configured to cause an inert gas to flow through the TD tube. The inert gas may be nitrogen. The TD tube sample may be configured to cause the inert gas to flow through the tube at a rate of at least 50 sccm, preferably at least 60 sccm, at least 80 sccm or at least 100 sccm, and most preferably at least 110 sccm or at least 120 sccm. The TD tube sample may be configured to cause the inert gas to flow through the tube at a rate of between 50 sccm and 250 sccm, preferably between 60 sccm and 200 sccm, between 80 sccm and 180 sccm or between 100 sccm and 160 sccm, and most preferably between 110 sccm and 150 sccm or between 120 sccm and 140 sccm.

Preferably, the TD tube sampler is configured to receive a plurality of TD tubes, wherein each tube comprises a sample. Preferably, the TD tube sampler is configured to reversibly couple to each of the TD tubes in turn and to feed the sample from the coupled TD tube to the direct injection mass spectrometer such that the sample does not pass through a cold trap. Advantageously, the TD tube sampler can automatically sample a plurality of TD tubes.

In accordance with a second aspect, there is provided an apparatus comprising the TD tube sampler of the first aspect and a direct injection mass spectrometer coupled thereto.

In accordance with a third aspect, there is provided a method of analysing a sample, the method comprising:
    desorbing a sample from a thermal desorption (TD) tube; and
    feeding the desorbed sample into a direct injection mass spectrometer to thereby analyse the sample;
wherein the method does not comprise feeding the sample into a cold trap.

The TD tube, sample and direct injection mass spectrometer may be as defined in relation to the first aspect.

Preferably, the method of the first aspect is conducted using the apparatus of the second aspect.

The method may comprise desorbing the sample for at least 1 minute, preferably at least 2 minutes, at least 4 minutes or at least 6 minutes, and most preferably at least 8 minutes The method may comprise desorbing the sample for less than 20 minute, preferably less than 18 minutes, less than 16 minutes or less than 14 minutes, and most preferably less than 12 minutes. The method may comprise desorbing the sample for between 1 minute and 20 minutes, preferably between 2 minutes and 18 minutes, between 4 minutes and 16 minutes or between 6 minutes and 14 minutes, and most preferably between 8 minutes and 12 minutes.

The method may comprise desorbing the sample by heating the TD tube to an elevated temperature. The method may comprise desorbing the sample by heating the TD tube to a temperature of at least 100° C., more preferably at least 150° C., at least 200° C. or at least 250° C., and most preferably at least 260° C. or at least 270° C. The method may comprise desorbing the sample by heating the TD tube to a temperature of between 100° C. and 450° C., more preferably between 150° C. and 400° C., between 200° C. and 350° C. or between 250° C. and 310° C., and most preferably between 260° C. and 300° C. or between 270° C. and 290° C.

Alternatively, or additionally, the method may comprise desorbing the sample by causing an inert gas to flow through the TD tube. The inert gas may be nitrogen. The method may comprise desorbing the sample by causing the inert gas to flow through the tube at a rate of at least 50 sccm, preferably at least 60 sccm, at least 80 sccm or at least 100 sccm, and most preferably at least 110 sccm or at least 120 sccm. The method may comprise desorbing the sample by causing the inert gas to flow through the tube at a rate of between 50 sccm and 250 sccm, preferably between 60 sccm and 200 sccm, between 80 sccm and 180 sccm or between 100 sccm and 160 sccm, and most preferably between 110 sccm and 150 sccm or between 120 sccm and 140 sccm.

The method may comprise initially connecting the TD tube to a TD tube sampler. The TD tube sampler may be as defined in the first aspect.

The method may comprise switching a valve to prevent the sample from being fed into a cold trap. Preferably, the method comprises switching the valve prior to desorbing the sample from the TD tube.

In one embodiment, the method may be used to identify one or more signature VOCs in a patient sample. Accordingly, the method may be used to diagnose a disease. The patient sample may be a breath sample, a blood sample or a urine sample.

In an alternative embodiment, the method may be used to identify one or more signature VOCs in a food sample. Accordingly, the method may be used to confirm that a food product meets the relevant safety requirements.

In a further alternative embodiment, the method may be used to identify one or more signature VOCs in a cosmetic sample, e.g. a perfume. Accordingly, the method may be used to confirm that a cosmetic product conforms to a defined product specification.

In a yet further alternative embodiment, the method may be used to identify one or more signature VOCs in an environmental sample. The environmental sample may comprise a water sample, soil sample or air sample. Accordingly, the method may be used to identify toxins in an environment.

In a still further embodiment, the method be used to identify one or more signature VOCs in an automotive emissions sample. Accordingly, the method may be used to determine whether or not an automobile complies with the relevant emissions requirements.

All features described herein (including any accompanying claims, abstract and drawings), and/or all of the steps of any method or process so disclosed, may be combined with any of the above aspects in any combination, except combinations where at least some of such features and/or steps are mutually exclusive.

For a better understanding of the invention, and to show how embodiments of the same may be carried into effect, reference will now be made, by way of example, to the accompanying drawings, in which:—

FIG. 4 is a schematic representation of a) a prior art device and b) a mass spectrometer in accordance with the present invention. The dashed line represents the path followed by VOCs prior to injection;

EXAMPLES

Materials and Methods

Measurements were conducted using a PTR-TOF 1000 instrument (Ionicon Analytik GmbH, Innsbruck, Austria). Optimal conditions for volatile organic compound (VOC) identification and quantification were defined according to a previously described experimental workflow[10], dedicated to method optimization under breath-relevant conditions. Briefly, the workflow consisted of: (i) screening of reduced drift field conditions using different reagent ions, (ii) evaluating the impact of a change in humidity on branching ratios and (iii) gravimetric calibration using permeation or diffusion tubes. Optimal conditions for the drift tube were: temperature 110° C., pressure 2.30 mbar and voltage 350 V, resulting in an E/N of 84 Td (1 Townsend=10-17 V cm2). Reagent and analyte ions used in VOC determination throughout the paper are summarized in table 1. Sample inlet flow rate was set to 200 and 130 sccm for direct injection and thermal desorption analysis, respectively.

TABLE 1

Mass peaks monitored in breath and standards with respective identifications

| Analyte ion (m/z) | Reagent ion | Reaction Channel | Identification |
|---|---|---|---|
| 57.03 | $NO^+$ | Hydride abstraction | Propanal |
| 59.05 | $H_3O^+$ | Proton transfer | Acetone |
| 71.05 | $NO^+$ | Hydride abstraction | Butanal |
| 89.06 | $H_3O^+$ | Proton transfer | Butanoic acid |
| 94.05 | $NO^+$ | Electron transfer | Phenol |
| 103.07 | $H_3O^+$ | Proton transfer | Pentanoic acid |
| 117.09 | $H_3O^+$ | Proton transfer | Hexanoic acid |
| 155.14 | $NO^+$ | Hydride abstraction | Decanal |

Figure 4A:
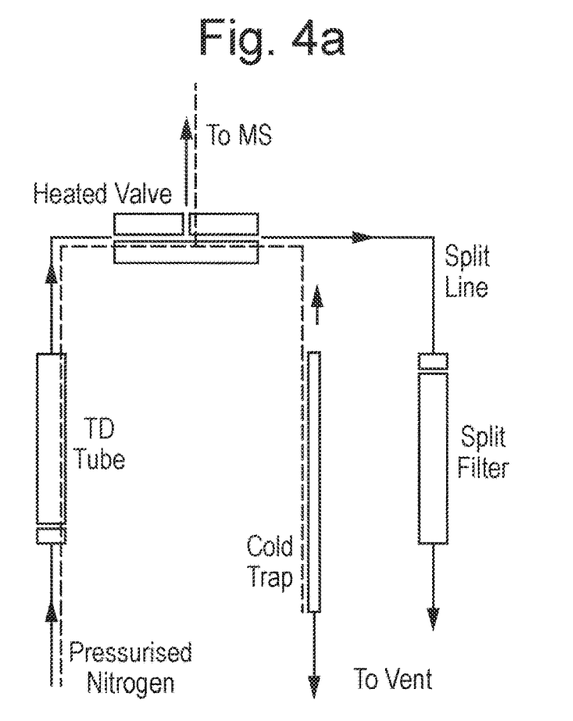
Figure 4B:
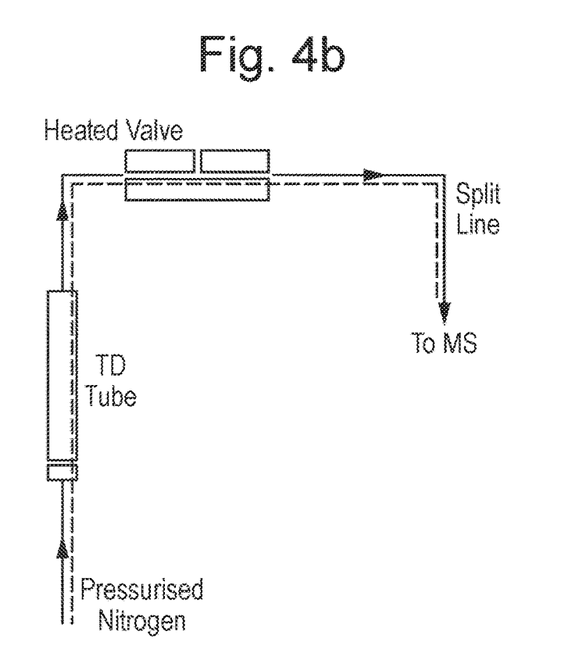
Figure 5:
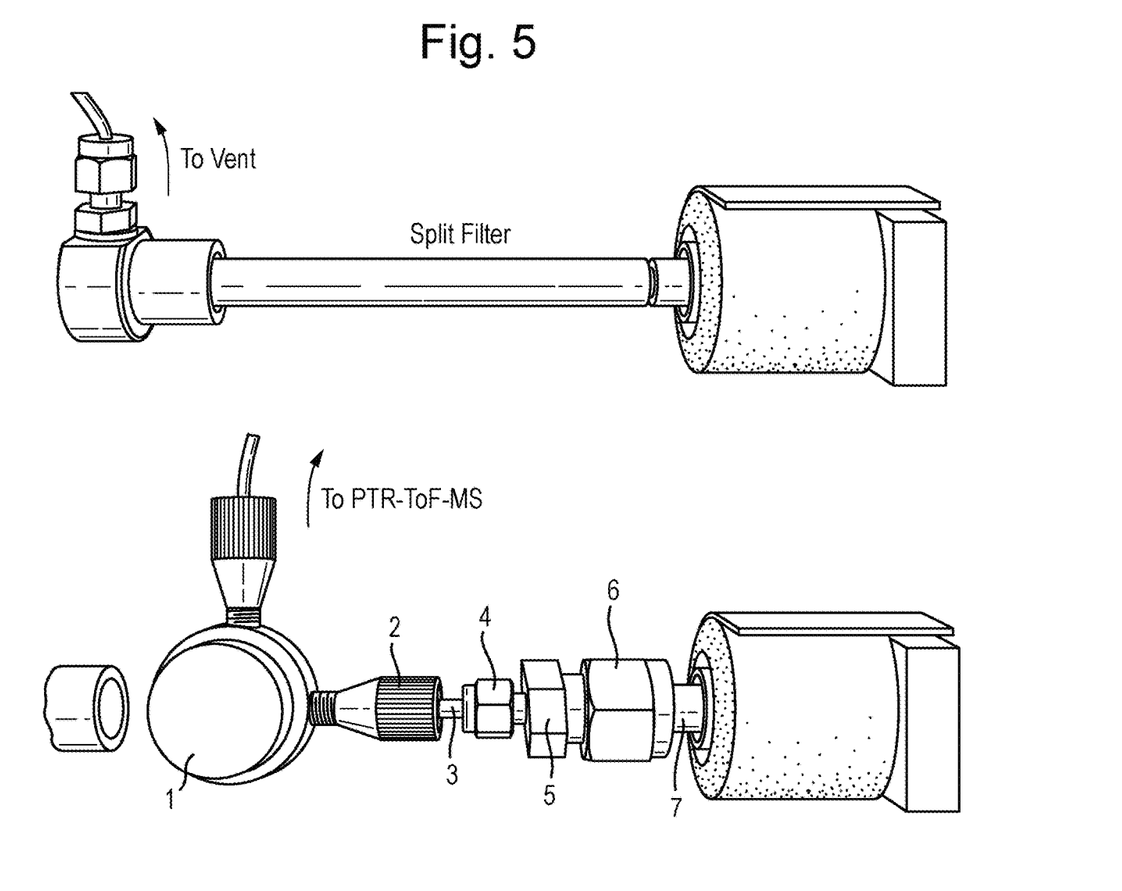
FIG. 5 a photo of a section of a prior art device (top), and a section of a mass spectrometer in accordance with the present invention (bottom)

A TD autosampler (TD100-xr, Markes International Ltd, Llantrisant, UK), which was adapted for PTR-MS analysis, was employed. The original configuration for TD analysis is shown in FIG. 4a. In the original configuration, the split line is normally left closed or used to remove excess sample or recollect VOCs onto a second TD tube for repeated analysis. As shown in FIG. 4b and FIG. 5 (bottom image), in the modified configuration, the split filter was replaced by a custom-made adapter which connects the TD tube directly to the PTR-MS inlet. The custom made adapter comprises:

a PEEK™ t-piece 1, with an inner diameter of 1/16";

a PEEK™ fingertight fitting 2, which has an inner diameter of 1/16";

a PEEK™ tubing 3, which has an inner diameter of 0.04";

a Swagelok™ nut 4, with an inner diameter of 1/16";

a Swagelok™ union 5, with an inner diameter of 1/16" at its first end and an inner diameter of 1/4" at its second end;

a further Swagelok nut 6, with an inner diameter of 1/4"; and stainless steel tubing 7, with a length of 22 mm and an inner diameter of 6.3 mm.

The t-piece 1 comprises an overflow aperture with a diameter of 1 mm configured to ensure the flow from the TD autosampler matches the flow of the PTR-MS.

The adapter allowed the collection of VOCs directly from the TD tube, entirely bypassing the cold trap and achieving one-stage desorption. In the final optimized TD method, TD tubes were desorbed for 10 minutes at 280° C. and 130 sccm using zero-grade nitrogen purified by means of a Supelpure HC hydrocarbon trap (Sigma Aldrich, St Louis Mo., USA).

For the calculation of breath VOC concentrations ($[VOC]_{breath}$) based on TD-PTR data, the inventors employed the following equation:

$$[VOC]_{breath} = ([VOC]_{TD} \times t_D \times \varphi)/V_b$$

Where $[VOC]_{TD}$ is the measured concentration, $t_D$ and $\varphi$ are desorption time and flow, respectively and $V_b$ is the collected breath volume or the standard volume loaded onto the tube. The same approached was used to compare loaded and desorbed VOC amounts when working with authentic standards.

The inventors employed stainless steel TD tubes containing a mixed sorbent bed consisting of Tenax TA/Carbograph 5TD (Bio-Monitoring C4-C30, Markes Ltd). TD tubes were conditioned using a TC 20 conditioning station (Markes Ltd) and following the manufacturer's recommendations. Authentic standards (Sigma Aldrich) were loaded into TD tubes by means of custom-made permeation tubes. The permeation tubes consisted of PTFE tubing, sealed at both ends. Permeation tubes were incubated at 30° C. at a constant flow rate using a permeation unit (ES 4050P, Eco Scientific, Stroud, Gloucestershire UK). Clean air was supplied using a membrane pump (KNF Neubeger UK, Witney, Oxfordshire), connected to a hydrocarbon trap. Before tube loading, the permeation unit was connected to the PTR-ToF-MS by means of a PEEK union connection and measurement was conducted for 3 minutes; the union was then switched by a TD tube placed between the permeation unit and the mass analyzer. Immediately upon switching a drop in VOC signals down to baseline levels was observed. Standard loading was conducted at a flow of 200 sccm for 2.5 minutes, during which no increase in the signals of the VOCs of interest was observed. This showed that sample VOC loading could be carried out without detectable breakthrough. After loading, the TD tube was removed and the device was connected back to the PTR-ToF-MS and left to equilibrate for 2 minutes.

The choice of compounds used was based upon previous studies on diagnosis of oesophago-gastric cancer and colorectal cancer by means of SIFT-MS[12,13,14]. The inventors selected three aldehydes (propanal, butanal, decanal), three fatty acids (butanoic acid, pentanoic acid, hexanoic acid) and phenol. Clinically relevant concentrations for these compounds range from the low-ppbV level to a few hundreds of ppbV.

In order to optimise desorption time on the one stage system, VOCs were loaded onto the TD tubes at a fixed reference concentration. For this experiment, in addition to the previously mentioned seven oxygenated VOCs, acetone was also loaded onto the TD tubes. Loading concentrations were: acetone 283.5 ppbV, butanoic acid 21.0 ppbV, pentanoic acid 70.1 ppbV, hexanoic acid 8.8 ppbV, phenol 88.7 ppbV, propanal 12.5 ppbV, butanal 4.9 ppbV, decanal 2.3 ppbV. Tubes were then analysed by TD-PTR-ToF-MS prolonging the desorption time up to 20 minutes.

The performance parameters for method validation and the techniques to evaluate them were chosen adopting the guidelines established by the European Respiratory Society technical standard for the analysis of exhaled biomarkers in lung disease[15], which recommend evaluating method performance with respect to linearity, limit of quantification (LOQ), limit of detection (LOD) and repeatability. Calibration curves were established based on comparison between loaded and desorbed amounts of the authentic standards. Different loading concentrations were achieved by changing the flow rate applied to the permeation oven. Ten TD tubes were prepared, corresponding to five concentration levels, each in duplicate.

Comparison with TD-GC-MS

The performance of the newly built TD-PTR-ToF-MS platform was directly compared with that of the leading technology for VOC quantitation, i.e. TD-GC-MS. TD-GC-MS analysis was conducted using a previously described analytical method[11]. The inventors employed a Markes TD-100 thermal desorption unit, using a two-stage desorption program. GC-MS analysis was performed using an Agilent 7890B GC with 5977A MSD (Agilent Technologies, Cheshire, UK) equipped with a Zebron ZB-642 capillary column (60 m×0.25 mm ID×1.40 μm df; Phenomenex Inc, Torrance, USA). Chromatographic peaks were normalised against an internal standard (d8-toluene, 10 ppm in nitrogen). This was added to each TD tube using a gas canister (Thames Restek). Calibration curves for TD-GC-MS were constructed by loading and analyzing a set of TD tubes on an analytical platform consisting of a commercial automated TD system, coupled to GC-quadrupole MS. The results were extracted as mass area units obtained in the total ion current mode.

Breath Collection and Analysis

The findings obtained on authentic standards were corroborated by means of experiments conducted on breath samples. Multiple breath samples (n=10) were collected within a limited time span from a healthy volunteer. The inventors employed a breath collection device (ReCIVA, Owlstone Ltd, Cambridge UK), using optimized sampling parameters, as determined in a previous study[10]. The device allowed for direct breath collection onto TD tubes. The tubes were then immediately analyzed by TD-PTR-ToF-MS. In this experiment, a desorption step of 20 minutes was employed. To assess the usability of the TD-PTR-ToF-MS analytical platform in the high throughput analysis of clinical samples, breath samples were collected from patients attending St Mary's Hospital for upper gastrointestinal endoscopy or surgery. The use of the ReCIVA breath collection device allowed the simultaneous sampling of up to four TD tubes from each patient. Ethical approval was obtained through NHS Health Research Authority (NRES Committee London—Camden and Islington, approval granted on 16 Jul. 2014, REC reference 14/LO/1136).

Quality Control

During the described experiments, a series of quality checks were conducted on the PTR-ToF-MS daily, according to a previously reported protocol[10]. Impurities with the three ionization modes were $O_2+(<2\%)$ for $H_3O^+$ as primary ion, $NO_2^+$ (<3%) for $O_2^+$ as primary ion and $NO^+$ and $NO_2^+$ (<5% altogether) for $O_2^+$ as primary ion, respectively. Quantitation accuracy with the three ions was within ±10% of a certified standard, represented by a Trace Source™ benzene permeation tube (Kin-Tek Analytical Inc., La Marque Tex.). The consistency of fragmentation with $NO^+$ and $H_3O^+$ as primary ions was assessed by measuring the ratio between reference mass peaks with given standard compounds. For $NO^+$, the inventors used the ratio between peaks m/z 71 and 43 using a butanal permeation tube standard. For $H_3O+$, the inventors used the ratio between peaks m/z 89 and 71 using a butanoic acid permeation tube standard. The values measured on the different days were within ±2% of the mean. Whenever required, the inventors optimized the voltage of the microchannel plate and the mass resolution (>1,500 m/$\Delta$m), using benzene (m/z 78 or 79 with $NO^+$ or $H_3O^+$, respectively) as reference compound.

Data Analysis

Data were extracted using PTRMS viewer version 3.2.2.2 (Ionicon Analytik). Additional data analysis was conducted using in-house generated scripts written using R programming language[16].

Results

Example 1—Optimization of TD Cycle Duration

Figure 1:
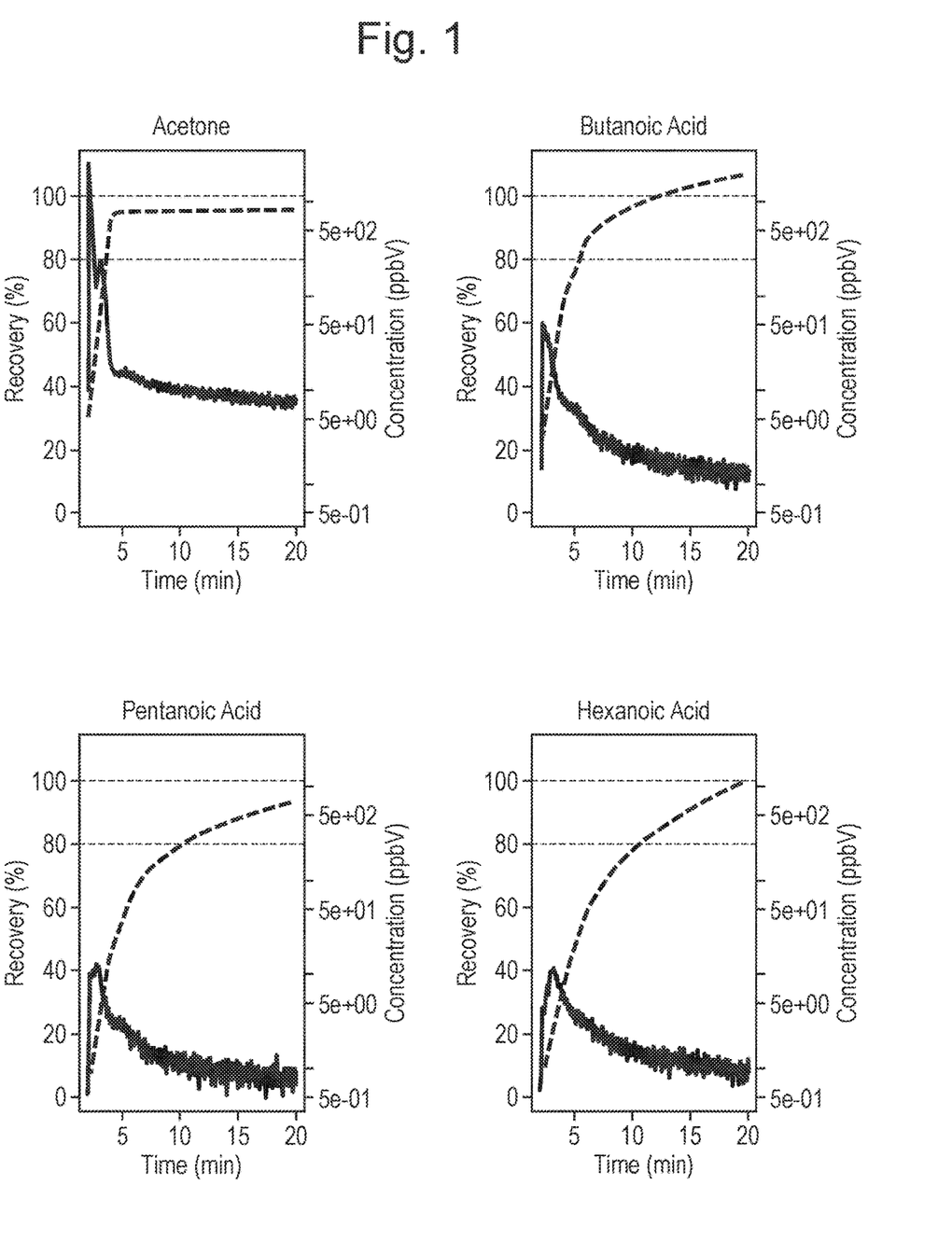
FIG. 1 shows the online monitoring of desorption using $H_3O^+$ (top) and $NO^+$ (bottom) reagent ions. The graphs show the average profile and recoveries of replicate measurements of thermal desorption (TD) tubes loaded with standards (continuous and dashed line, respectively)

Rapidity of analysis is a highly desirable characteristic for a method intended for large-scale clinical studies: for TD-PTR-ToF-MS the main limiting factor is the duration of the TD analytical cycle. The transition from two-stage to one-stage desorption allows for a first reduction in the TD cycle. Another step affecting TD cycle length is desorption time: the goal is to minimize its duration without compromising analyte (VOC) recovery. Using the permeation unit, eight VOCs (acetone, butanoic acid, pentanoic acid, hexanoic acid, phenol, propanal, butanal and decanal) were loaded onto the TD tubes at fixed concentrations. Concentrations ranged between a few ppbV to a few hundred ppbV, aiming to simulate a breath-relevant concentration for each of the compounds. The possibility to monitor VOC release online throughout desorption allowed an optimal time to be selected by means of a single experiment, without the need to test different desorption times separately. Experiments were conducted using $H_3O^+$ and $NO^+$ as reagent ions (11 and 9 replicates, respectively). The mean release profiles in FIG. 1 show a compound-dependent behaviour, with acetone displaying the fastest kinetics, followed by phenol, aldehydes and fatty acids. By comparing loading and desorbed concentrations, it was possible to estimate recoveries. Optimal desorption time was set at 10 minutes, which allowed to attain 80% recovery or higher for all the analytes evaluated. It is also worth mentioning that for some compounds, and especially at desorption times >10 min, recovery percentages higher than 100% are obtained. This is probably due to residual VOC amounts remaining on TD tubes after conditioning, that lead to an overestimation of recoveries.

Example 2—Analytical Performance of TD-PTR-TOF-MS

Calibration curves allowed the assessment of linearity ($R^2$=0.98-0.99) within a realistic concentration range for each of the VOCs of interest, see table 2. Slopes were reasonably close to unity (0.8-1.3), indicating that quantitative or near-quantitative VOC recovery was achieved. Limits of detection (LOD) and quantification (LOQ) were established by measuring blank TD tubes (n=45 for each of the primary ions). LOD and LOQ were fixed at 3-fold and 5-fold the background standard deviation and were in the order of 0.2-0.9 and 0.3-1.5 ppbV, respectively.

TABLE 2

Limit of detection (LOD), limit of quantification (LOQ), calibration curve parameters and linearity assessed on seven selected compounds (n = 10) using TD-PTR-ToF-MS.

| Compound | LOD[a] (ppbV) | LOQ[a] (ppbV) | Intercept | Slope | Linear range (ppbV) | $R^2$ |
|---|---|---|---|---|---|---|
| Butanoic acid | 0.6 | 0.9 | −1.21 | 1.09 | 27-533 | 0.995 |
| Pentanoic acid | 0.2 | 0.3 | 0.03 | 1.04 | 5-83 | 0.995 |
| Hexanoic acid | 0.2 | 0.4 | 0.54 | 0.8 | 2-17 | 0.988 |
| Propanal | 0.8 | 1.3 | −5.9 | 1.3 | 9-109 | 0.999 |
| Butanal | 0.9 | 1.5 | −1.77 | 1.05 | 7-95 | 0.999 |
| Phenol | 0.5 | 0.9 | 0.44 | 0.94 | 3-41 | 0.997 |
| Decanal | 0.3 | 0.5 | −1.24 | 1.25 | 2-21 | 0.999 |

Repeatability was assessed by applying the same methodology: TD tubes were loaded at three different concentration levels for all compounds, repeating the procedure in duplicate on five different days. Coefficients of variation of repeated measurements were in the range 7-20% and recoveries remained higher than 83% for all tested VOCs. The results are shown in table 3.

TABLE 3

Repeatability and mean recovery assessed on seven selected compounds (n = 10)

| Compound | Concentration level | Mean (±SD) | Recovery (%) |
|---|---|---|---|
| Butyric acid | High | 559 (±77) | 92% |
|  | Mid | 377 (±62) | 97% |
|  | Low | 54 (±4) | 89% |
| Pentanoic acid | High | 97 (±10) | 91% |
|  | Mid | 46 (±6) | 94% |
|  | Low | 12 (±1) | 87% |
| Hexanoic acid | High | 19 (±4) | 100% |
|  | Mid | 11 (±1) | 89% |
|  | Low | 5 (±1) | 92% |
| Propanal | High | 116 (±22) | 94% |
|  | Mid | 79 (±14) | 110% |
|  | Low | 13 (±1) | 85% |
| Butanal | High | 99 (±17) | 95% |
|  | Mid | 44 (±6) | 110% |
|  | Low | 10 (±1) | 83% |
| Phenol | High | 34 (±5) | 104% |
|  | Mid | 19 (±1) | 128% |
|  | Low | 4 (±0.5) | 94% |
| Decanal | High | 20 (±0.4) | 122% |
|  | Mid | 5 (±0.1) | 96% |
|  | Low | 3 (±0.6) | 90% |

Example 3—Comparison with TD-GC-MS

Figure 2:
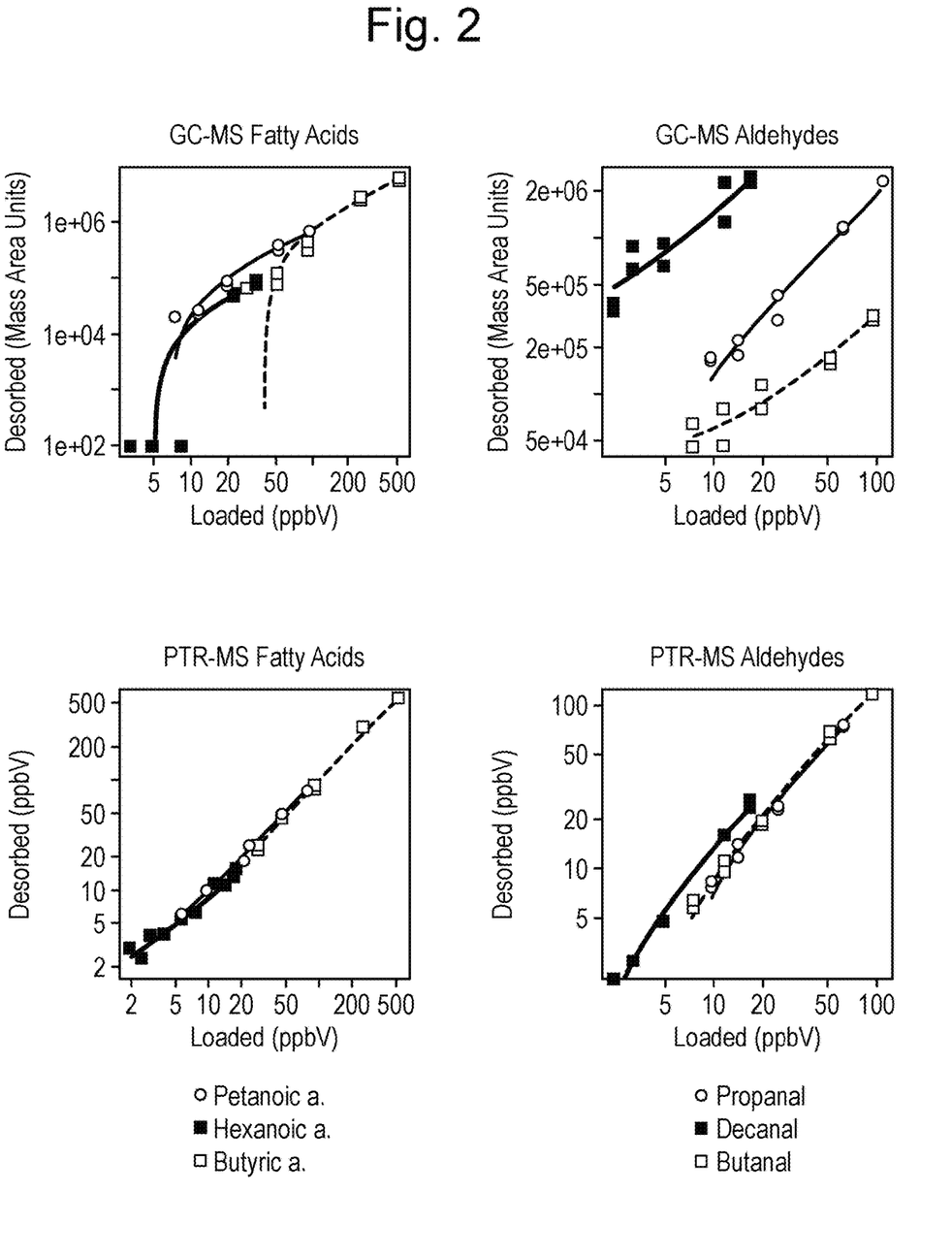
FIG. 2 shows calibration curves obtained on selected aldehydes and fatty acids using Thermal Desorption Proton Transfer Reaction Time-of-Flight Mass Spectrometry (TD-PTR-ToF-MS) and Thermal Desorption Gas Chromatography Mass Spectrometry (TD-GC-MS), where □=propanal/butanoic acid, ●=butanal/pentanoic acid, and ■=decanal/hexanoic acid.

FIG. 2 displays a direct comparison of calibration curves obtained for aldehydes and fatty acids with TD-PTR-ToF-MS and TD-GC-MS. The visual inspection of the plots showed that, whereas for PTR-MS good linearity was obtained across the whole concentration range, in GC-MS analysis data deviated from linearity at low concentrations. Linearity was better for aldehydes ($R^2$=0.97-0.99) than fatty acids ($R^2$=0.89-0.98), whose detection in the low-ppbV range was either challenging or impossible (e.g. for hexanoic acid) under the tested conditions. The overall analytical conditions chosen for TD-PTR-ToF-MS guaranteed a relatively uniform analytical response: for all tested compounds the ratio between signal levels (in counts per second) and measured concentrations was in the range 100±20 cps/ppbV. This was not equally true for TD-GC-MS analysis: analytical response (measured in mass area units/ppbV) varied by as much as two orders of magnitude in the case of aldehydes, see FIG. 2. This remarkable variability in response factors observed in GC-MS is a well-known phenomenon[17] and it is related to a complex interplay of factors, including compound volatility, ionization efficiency and chromatographic resolution. The higher complexity of two-stage TD likely contributes to this variability. The low sensitivity observed in the case of fatty acids could be related to the relatively high volatility of short-chain fatty acids: GC-MS performance in fatty acid determination would most likely improve with the use of a dedicated method using derivatisation[18].

Example 4—Breath Analysis by TD-PTR-ToF-MS

Figure 3:
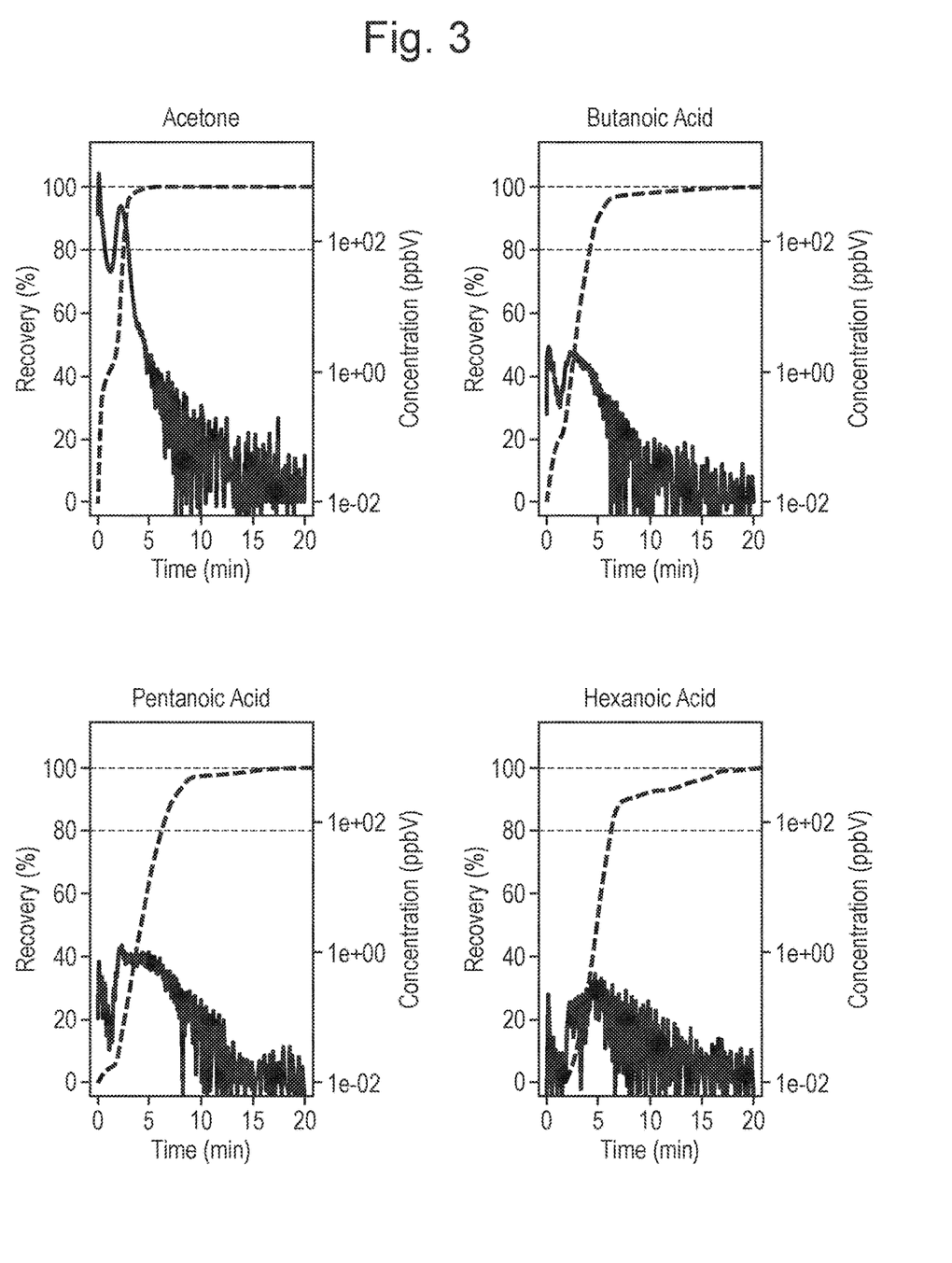
FIG. 3 shows the online monitoring of desorption using $H_3O^+$ (top) and $NO^+$ (bottom). The graphs show the average profile and recoveries of breath sample replicates after blank TD tube subtraction (continuous and dotted line, respectively)

The findings obtained on authentic standards were compared to the results obtained by the analysis of breath samples obtained from a healthy volunteer. Tentative identifications were based on accurate mass determination (within ±0.01 mass-to-charge ratio). The perusal of online desorption profiles confirms that, for all considered compounds, the first 10 minutes of desorption encompass at least 90% of the total VOC release, see FIG. 3. For the most low-boiling VOCs (e.g. acetone or propanal), release seems to proceed very rapidly and a first peak in released concentrations is reached within 5 seconds. This shows how having a high time resolution mass analyzer offers the best chances to fully characterize such a complex analytical matrix as breath.

The optimized TD cycle has an overall duration of 15 minutes (10 min desorption+5 min between tube loading and unloading and leak test). This results in an expected throughput of nearly 100 samples for 24 hours of continuous operation. This was eventually confirmed by means of a platform usability study. Breath was sampled onto TD tubes using a breath collection device (Experimental Section) from 46 patients attending St Mary's Hospital (Paddington, London) for upper gastrointestinal endoscopy or surgery. Two TD tubes were collected for each patient and each tube was analysed by TD-PTR-ToF-MS, employing either $H_3O^+$ or $NO^+$ as the reagent ion. The 92 tubes were processed by the analytical platform over 24 hours of continuous, unattended operation, thus corroborating the usability of the platform for large-scale clinical studies. Table 4 shows concentration ranges for the seven target VOCs. In addition to that, breath acetone was quantified in order to evaluate the platform performance on an abundant, well characterized breath VOC. Aldehydes, fatty acids and phenol remained well above the limit of quantification, with the exception of decanal, with 3 samples out of 46 lower than LOQ. The range of concentration established for acetone was similar to the values reported for adult volunteers using SIFT-MS[19].

TABLE 4

Platform usability: detection and quantification of 8 VOCs in 46 patients

| Compound | Minimum (ppbV) | $1^{st}$ quartile (ppbV) | Median (ppbV) | $3^{rd}$ quartile (ppbV) | Maximum (ppbV) |
|---|---|---|---|---|---|
| Acetone | 33.6 | 161 | 274.8 | 523.5 | 1760.3 |
| Butanoic acid | 1.4 | 2.7 | 3.8 | 4.9 | 74.4 |
| Pentanoic acid | 0.7 | 1.5 | 2 | 2.4 | 3.5 |
| Hexanoic acid | 0.4 | 0.8 | 1.1 | 1.7 | 10.6 |
| Phenol | 2.2 | 5.9 | 7.6 | 10.2 | 21.4 |
| Propanal | 2.9 | 3.9 | 4.9 | 7.3 | 9.9 |
| Butanal | 1.4 | 1.9 | 2.6 | 3.5 | 5.4 |
| Decanal | $0.5^a$ | 0.7 | 0.8 | 0.9 | 1.9 |

$^a$For decanal, 3 samples were below LOQ

Example 5—Comparison with Two-Stage TD-PTR-ToF-MS

Limits of detection (LOD) and quantification (LOQ) were calculated for four selected compounds using both the modified one-stage TD-PTR-ToF-MS device, according to the present invention, and the prior art unmodified two-stage TD-PTR-ToF-MS device. The methods used were the same as described in example 3. The results are shown in table 5.

TABLE 5

Performance comparison between two-stage and one-stage TD setup

| Device | Compound | Primary ion | LOD (ppbV) | LOQ (ppbV) | Accuracy (%) | Linearity range (ppbV) |
|---|---|---|---|---|---|---|
| One-stage | Butanal | $NO^+$ | 0.1 | 0.5 | 73-94% | 5-102 |
| Two-stage | Butanal | $NO^+$ | 1.1 | 3.7 | 91-117% | 5-55 |
| One-stage | Phenol | $NO^+$ | 0.6 | 2 | 125-103% | 2-18 |
| Two-stage | Phenol | $NO^+$ | n.a. | n.a. | n.a. | n.a. |
| One-stage | Decanal | $NO^+$ | 0.3 | 1 | 75-98% | 1-16 |
| Two-stage | Decanal | $NO^+$ | n.a. | n.a. | n.a. | n.a. |
| One-stage | Butyric acid | $H_3O^+$ | 0.8 | 2.7 | 76-115% | 20-647 |
| Two-stage | Butyric acid | $H_3O^+$ | 2.8 | 9.4 | 62-106% | 44-360 |

Accuracy was calculated by comparing the results with direct analysis. Linearity was calculated by undertaking a visual inspection of the graphs.

Figure 6:
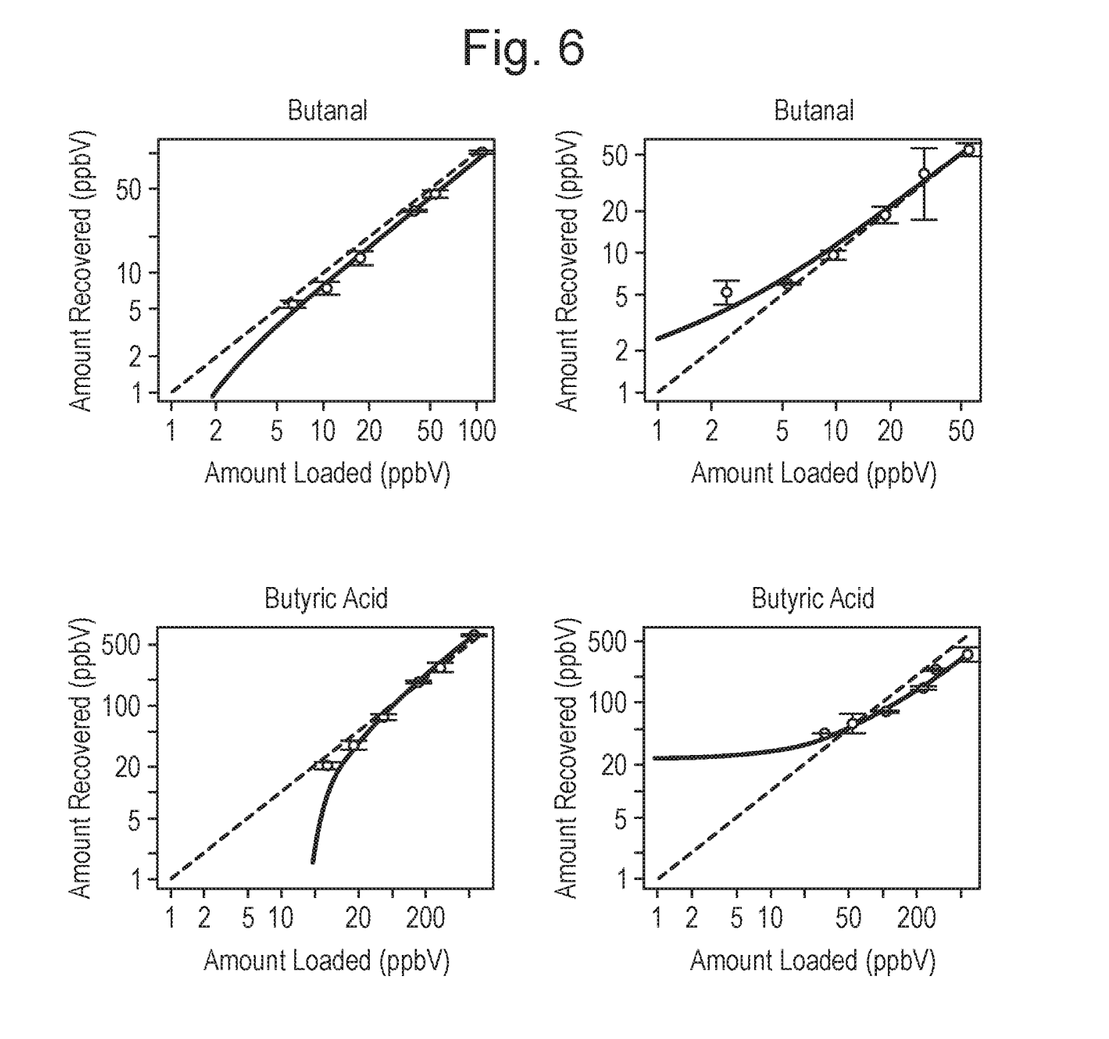
FIG. 6 shows calibration curves obtained using a one-stage TD setup vs. a two-stage TD setup (left and right respectively).

Visual inspection of FIG. 6 shows that for decanal and phenol it was not possible to obtain reliable values for the calibration curves in the two-stage configuration. In some instances an accuracy of higher than 100% is obtained: this is likely due to the presence of a background signal from the blank TD tube.

A comparison of the time required to analyse the contents of a single TD tube using both the two-stage and one-stage devices is given in table 6.

TABLE 6

Comparison of analytical cycle duration between the two-stage and one-stage TD setup

| Step | Two-stage | One-stage |
|---|---|---|
| TD tube purge | 1' | — |
| TD tube desorb | 20' | 10' |
| CT purge | 1' | — |
| CT desorb | 6' | — |
| Other | 6' | 6' |
| Cleaning | 10' | — |
| TOTAL | 44' | 16' |

The 6 minutes listed under "other" comprises movement of mechanical parts and self-testing of the TD apparatus which is performed at each cycle.

CONCLUSION

This research work addresses the development of a new analytical platform, based on TD-PTR-ToF-MS, and its applicability to breath analysis. This platform displays high throughput and sensitivity. Limits of detection and quantification were in the order of 0.2-0.9 and 0.3-1.5 parts per billion by Volume (ppbV), respectively. Analytical recoveries from TD tubes were 83% or higher and coefficients of variation were below 20% of mean values. When tested against the VOC panel, the platform showed better linearity and sensitivity than the currently available leading technology (i.e. TD-GC-MS). The usability of the platform was evaluated in the analysis of a set of breath samples of clinical origin, allowing for a throughput of nearly wo TD tubes for 24 hours of continuous operation. All these characteristics enhance the implementation of TD-PTR-ToF-MS for large-scale clinical studies.

Using this approach, breath could be collected from multiple GP practices or clinical hubs, in a similar way to what is already done for blood samples today. Samples would then be analysed in a regional lab by means of TD-PTR-ToF-MS. The platform is based on a new coupling strategy that permits one-stage desorption. This appears to be better suited for coupling to a direct-injection MS instrument, such as PTR-ToF-MS or SIFT-MS. It must be noted that this coupling, however unprecedented, is easily reproducible using commercial instrumentation and readily available materials. Based on the inventors' preliminary comparison with TD-GC-MS, TD-PTR-ToF-MS appears to offer some advantages in terms of analytical performance.

The main limitation of direct injection MS resides in the absence of a chromatographic separation step: hence, unambiguous VOC identification within complex matrices is not always possible. A possible solution could be represented by the simultaneous analysis of a subset of the samples by means of TD-GC-MS for cross-platform comparison and robust identification.

REFERENCES

1. Amann, A.; Miekisch, W.; Schubert, J.; Buszewski, B.; Ligor, T.; Jezierski, T.; Pleil, J.; Risby, T. Annu Rev Anal Chem (Palo Alto Calif.) 2014, 7, 455-482.
2. Smith, D.; Španěl, P.; Herbig, J.; Beauchamp, J. Journal of Breath Research 2014, 8 (2), 027101.
3. Markar, S. R.; Lagergren, J.; Hanna, G. B. BMJ Open 2016, 6 (1), e009139.
4. Chow, J. C.; Yu, J. Z.; Watson, J. G.; Hang Ho, S. S.; Bohannan, T. L.; Hays, M. D.; Fung, K. K. Journal of Environmental Science and Health, Part A 2007, 42 (ii), 1521-1541.
5. Crespo, E.; Devasena, S.; Sikkens, C.; Centeno, R.; Cristescu, S. M.; Harren, F. J. M. Rapid Communications in Mass Spectrometry 2012, 26 (8), 990-996.
6. Hryniuk, A.; Ross, B. M. International Journal of Mass Spectrometry 2009, 285 (1-2), 26-30.
7. Jordan, A.; Haidacher, S.; Hanel, G.; Hartungen, E.; Mark, L.; Seehauser, H.; Schottkowsky, R.; Sulzer, P.; Mark, T. D. International Journal of Mass Spectrometry 2009, 286 (2-3), 122-128.
8. Erickson, M. H.; Gueneron, M.; Jobson, B. T. Atmospheric Measurement Techniques 2014, 7 (1), 225-239.
9. Holzinger, R.; Williams, J.; Herrmann, F.; Lelieveld, J.; Donahue, N. M.; Röckmann, T. Atmospheric Chemistry and Physics 2010, 10 (5), 2257-2267.
10. Romano, A.; Hanna, G. B. Journal of Mass Spectrometry 2018, 10.1002/jms.4063.
11. Doran, S.; Romano, A.; Hanna, G. B. Journal of Breath Research 2017.
12. Kumar, S.; Huang, J.; Abbassi-Ghadi, N.; Španěl, P.; Smith, D.; Hanna, G. B. Analytical Chemistry 2013, 85 (12), 6121-6128.
13. Kumar, S.; Huang, J.; Abbassi-Ghadi, N.; Mackenzie, H. A.; Veselkov, K. A.; Hoare, J. M.; Lovat, L. B.; Španěl, P.; Smith, D.; Hanna, G. B. Annals of Surgery 2015, 262 (6), 981-990.
14. Markar, S. R.; Chin, S.-T.; Romano, A.; Wiggins, T.; Antonowicz, S.; Paraskeva, P.; Ziprin, P.; Darzi, A.; Hanna, G. B. Breath Volatile Organic Compound Profiling of Colorectal Cancer Using Selected Ion Flow-Tube Mass Spectrometry. Annals of Surgery 2017, 1.
15. Horváth, I.; Barnes, P. J.; Loukides, S.; Sterk, P. J.; Högman, M.; Olin, A.-C.; Amann, A.; Antus, B.; Baraldi, E.; Bikov, A.; Boots, A. W.; Bos, L. D.; Brinkman, P.; Bucca, C.; Carpagnano, G. E.; Corradi, M.; Cristescu, S.; de Jongste, J. C.; Dinh-Xuan, A.-T.; Dompeling, E.; Fens, N.; Fowler, S.; Hohlfeld, J. M.; Holz, O.; Jöbsis, Q.; Van De Kant, K.; Knobel, H. H.; Kostikas, K.; Lehtimäki, L.; Lundberg, J. O.; Montuschi, P.; Van Muylem, A.; Pennazza, G.; Reinhold, P.; Ricciardolo, F. L. M.; Rosias, P.; Santonico, M.; van der Schee, M. P.; van Schooten, F.-J.; Spanevello, A.; Tonia, T.; Vink, T. J. European Respiratory Journal 2017, 49 (4), 1600965.
16. R Core Team. R Foundation for Statistical Computing, Vienna, Austria. 2017.
17. Kloos, D.; Lingeman, H.; Mayboroda, O. A.; Deelder, A. M.; Niessen, W. M. A.; Giera, M. Analysis of Biologically-Active, Endogenous Carboxylic Acids Based on Chromatography-Mass Spectrometry. TrAC Trends in Analytical Chemistry 2014, 61, 17-28.
18. Schieberle, P.; Molyneux, R. J. Quantitation of Sensory-Active and Bioactive Constituents of Food: A Journal of Agricultural and Food Chemistry Perspective. Journal of Agricultural and Food Chemistry 2012, 60 (10), 2404-2408.
19. Španěl, P.; Dryahina, K.; Smith, D. Acetone, Ammonia and Hydrogen Cyanide in Exhaled Breath of Several Volunteers Aged 4-83 Years. Journal of Breath Research 2007, 1 (1), 011001.

The invention claimed is:

1. A thermal desorption (TD) tube sampler, wherein the sampler comprises a first connector configured to reversibly connect to a TD tube containing a sample, and a second connector configured to couple to a direct injection mass spectrometer, and the TD tube sampler is configured to desorb a sample in a TD tube connected thereto, and feed the desorbed sample from the TD tube to a direct injection mass spectrometer such that the desorbed sample does not pass through a cold trap, wherein the TD tube sampler comprises a cold trap and is configured to couple to a gas chromatography mass spectrometer (GC-MS), and the TD tube sampler has a first operating mode, for use when the TD tube sampler is coupled to a direct injection mass spectrometer, wherein the TD sampler is configured to feed the sample from the TD tube to the direct injection mass spectrometer such that the sample does not pass through the cold trap; and a second operating mode, for use when the TD tube sampler is coupled to a GC-MS, wherein the TD sampler is configured to feed the sample from the TD tube to the direct injection mass spectrometer such that the sample does pass through the cold trap.

2. A TD tube sampler according to claim 1, wherein the TD tube sampler does not comprise a cold trap.

3. A TD tube sampler according to claim 2, wherein the TD sampler comprises a conduit which extends between the first connector and the second connector, and the conduit comprises an aperture therein fluidly connecting an internal channel of the conduit to an external environment.

4. A TD tube sampler according to claim 1, wherein the sample comprises one or more volatile organic compounds (VOCs).

5. A TD tube sampler according to claim 1, wherein the TD sampler may be configured to desorb the sample for between 1 minute and 20 minutes.

6. A TD tube sampler according to claim 1, wherein the TD tube sampler is configured to desorb the sample by being configured to heat the TD tube to a temperature of between 100° C. and 450° C.

7. A TD tube sampler according to claim 1, wherein the TD tube sampler is configured to desorb the sample by being configured to cause an inert gas to flow through the TD tube at a rate of between 50 sccm and 250 sccm.

8. A TD tube sampler according to claim 1, wherein the TD tube sampler is configured to receive a plurality of TD tubes, wherein each tube comprises a sample, and the TD tube sampler is configured to reversibly couple to each of the TD tubes in turn and to feed the sample from the coupled TD tube to the direct injection mass spectrometer such that the sample does not pass through a cold trap.

9. An apparatus comprising the TD tube sampler according to claim 1 and a direct injection mass spectrometer coupled thereto.

10. An apparatus according to claim 9, wherein the direct injection mass spectrometer comprises a selected ion flow tube mass spectrometer (SIFT-MS), a proton transfer reaction mass spectrometer (PTR-MS), or an ion mobility spectrometer (IMS).

11. An apparatus according to claim 10, wherein the proton transfer reaction mass spectrometer is a proton transfer reaction time-of-flight mass spectrometer (PTR-ToF-MS).

12. A method of analysing a sample, the method comprising:
    desorbing a sample from a thermal desorption (TD) tube; and
    feeding the desorbed sample into a direct injection mass spectrometer to thereby analyse the sample;
    wherein the method does not comprise feeding the sample into a cold trap, and wherein the method comprises switching a valve to prevent the sample from being fed into a cold trap.

13. A method according to claim 12, wherein the method is used to identify one or more signature VOCs in a patient sample, a food sample, a cosmetic sample, an environmental sample or an automotive emissions sample.

* * * * *